United States Patent [19]

Studholme

[11] Patent Number: 6,133,382
[45] Date of Patent: Oct. 17, 2000

[54] FIBER-FORMING POLYAMIDE COMPOSITION CONTAINING POLYAMIDE AND A SULFONATED POLYESTER CONCENTRATE

[75] Inventor: Matthew B. Studholme, Abingdon, Va.

[73] Assignee: Prisma Fibers, Inc., Bristol, Va.

[21] Appl. No.: 09/190,143

[22] Filed: Nov. 12, 1998

Related U.S. Application Data

[63] Continuation-in-part of application No. 08/522,123, Aug. 31, 1995.

[51] Int. Cl.⁷ .............................. C08L 77/06; C08L 67/02
[52] U.S. Cl. ............................................. 525/425; 528/295
[58] Field of Search .............................. 525/425; 528/295

[56] References Cited

U.S. PATENT DOCUMENTS

| | | | |
|---|---|---|---|
| 3,142,662 | 7/1964 | Huffman | 260/78 |
| 3,184,436 | 5/1965 | Magat . | |
| 3,296,204 | 1/1967 | Caldwell | 260/49 |
| 3,365,427 | 1/1968 | Ballentine et al. | 260/78 |
| 3,389,549 | 6/1968 | David | 57/140 |
| 3,409,596 | 11/1968 | Unger et al. | 260/78 |
| 3,440,226 | 4/1969 | Crovatt | 260/78 |
| 3,448,087 | 6/1969 | Ballentine et al. | 260/78 |
| 3,542,743 | 11/1970 | Flamand | 260/78 |
| 3,553,286 | 1/1971 | Murata et al. | 260/857 |
| 3,565,910 | 2/1971 | Elbert et al. | 260/30.8 |
| 3,640,942 | 2/1972 | Crampsey | 260/37 N |
| 3,846,507 | 11/1974 | Thomm et al. | 260/857 TW |
| 3,853,820 | 12/1974 | Vachon | 528/301 |
| 3,898,200 | 8/1975 | Lofquist | 260/78 L |
| 3,923,749 | 12/1975 | Howell | 260/78 L |
| 4,083,893 | 4/1978 | Lofquist et al. | 260/857 UN |
| 4,097,546 | 6/1978 | Lofquist | 260/857 UN |
| 4,303,577 | 12/1981 | Ridgway et al. | 260/45.75 C |
| 4,340,519 | 7/1982 | Kotera et al. | 525/444 |
| 4,374,641 | 2/1983 | Burlone | 8/557 |
| 4,391,968 | 7/1983 | Merani et al. | 528/321 |
| 4,579,762 | 4/1986 | Ucci | 428/95 |
| 4,680,212 | 7/1987 | Blyth et al. | 428/97 |
| 4,780,099 | 10/1988 | Greschler et al. | 8/115.6 |
| 5,108,684 | 4/1992 | Anton et al. | 264/176.1 |
| 5,141,692 | 8/1992 | Shridharani et al. | 264/210.6 |
| 5,145,487 | 9/1992 | Hangey et al. | 8/557 |
| 5,164,261 | 11/1992 | Windley | 428/364 |
| 5,236,645 | 8/1993 | Jones | 264/78 |
| 5,279,899 | 1/1994 | Asrar | 428/458 |
| 5,820,982 | 10/1998 | Salsman | 528/279 |

FOREIGN PATENT DOCUMENTS

| | | |
|---|---|---|
| 035051 | 9/1981 | European Pat. Off. . |
| 373655 | 6/1990 | European Pat. Off. . |
| 421971 | 4/1991 | European Pat. Off. . |
| 470614 | 2/1992 | European Pat. Off. . |
| 517203 | 2/1992 | European Pat. Off. . |
| 4309436 | 9/1994 | Germany . |
| 59-36155 | 2/1984 | Japan . |
| 60-209014 | 10/1985 | Japan . |
| 5-086287 | 4/1993 | Japan . |
| 5-140499 | 6/1993 | Japan . |
| 901938 | 7/1962 | United Kingdom . |
| 901939 | 7/1962 | United Kingdom . |
| 1205563 | 9/1970 | United Kingdom . |
| 92/08828 | 5/1992 | WIPO . |
| 93/19239 | 9/1993 | WIPO . |
| 96/17982 | 6/1996 | WIPO . |

OTHER PUBLICATIONS

Derwent accession no. 94–303668/38 for German Patent No. 4,309,436 Sandoz–Patent–Gmb H, Sep. 1994.

*Primary Examiner*—Robert E. L. Sellers
*Attorney, Agent, or Firm*—Dykema Gossett, PLLC

[57] ABSTRACT

A fiber-forming polyamide composition contains a fiber forming polyamide and a sulfonated polyester concentrate, the concentrate disabling and dye sites in the polyamide so that fibers formed from the composition will have enhanced stain and soil resistance. The sulfonated polyester concentrate contains a reagent, preferably an alkali metal salt of 5-sulfoisophthalic acid, and thermoplastic polyester, preferably one or more of PET, PTT, PBT, PETG and poly (ethylene terephthalate-co-isophthalate).

7 Claims, No Drawings

FIBER-FORMING POLYAMIDE COMPOSITION CONTAINING POLYAMIDE AND A SULFONATED POLYESTER CONCENTRATE

CROSS-REFERENCE TO RELATED APPLICATION

This application is a continuation-in-part of application Ser. No. 08/522,123, filed Aug. 31, 1995, pending.

BACKGROUND OF THE INVENTION

1. Field of the Invention

The invention relates to stain resistant and soil resistant polyamide compositions and fibers formed therefrom, the fibers being particularly useful in the manufacture of textile articles, carpets and floorcoverings.

2. The Prior Art

Carpet yarns prepared from polyamide fibers are subject to staining by a variety of foods, drinks and many other compositions with which it comes in accidental contact. The uptake of acid dye stains from, for example, soft drinks, is a particularly vexing problem for polyamide fibers due to the availability therein of acid dye sites such as amine end groups and amide linkages. Several methods have been suggested for enhancing the resistance of polyamide fibers to acid dye stains. One approach is to apply a so-called topical "stain blocker" coating to the surfaces of the polyamide fibers to prevent access to the acid dye sites therein by the acid dye staining composition. One of the main types of topical stainblocker are sulfonated aromatic condensates (SAC). There are a number of patents covering SACs. Examples of the method include U.S. Pat. Nos. 5,145,486, 4,680,212 and 4,780,099. Polyamides that are topically coated with SACs have the disadvantage that the topical coating is removed during use and maintenance. Gradual removal of the coating will also occur during cleaning with water and detergents. Fibers used for carpet applications may be regularly cleaned with alkaline-based cleaning agents. SAC topical coatings are easily removed using these types of cleaning agents. The topical coating will also be gradually removed during normal wear of the fiber. In addition to their removal during use and maintenance, SACs generally have inferior resistance to light, oxides of nitrogen, and bleach, the latter being commonly used for the cleaning of industrial textiles and carpets. Also, the base color of SACs is not colorless and thus may change the shade of the color of the yarn.

Another approach for enhancing the resistance of polyamide fibers to acid dye stains is to form the fibers from polyamides prepared by copolymerizing monomers, some of which contain sulfonate moieties. Typical of such systems are those disclosed in U.S. Pat. Nos. 3,542,743, 3,846,507, 3,898,200, 4,391,968, 5,108,684, and 5,164,261 and EP 517,203. All of these prior art patents teach that aryl sulfonate units, when added at the start of the polymerization with the other desired monomers, act as comonomers and become integral parts of the polyamide chain. All of these patents are concerned with modifying the dyeing or stain resistant characteristics of the polyamide.

Fibers are generally prepared from polyamides by melt spinning. Sulfonate-containing polyamides generally have higher melt viscosities than non-sulfonate-containing polyamides for equivalent relative solution viscosities, which limits the extent of polymerization that can practically be achieved in batch autoclave reaction vessels due to the retardation thereby of the rate of polymerization, as well as hinderance of effective discharge of the polymerized melt from the reactor. In addition, the presence of sulfonates which have surfactant properties promotes excessive foaming during the melt polymerization process, resulting in poor agitation of the reaction mixture and non-uniformity of product. An additional disadvantage associated with sulfonate-containing polyamide copolymers is that they are generally more difficult to dry than sulfonate-free polyamides due to the hygroscopic nature of the sulfonate groups.

Yarns having different depths of color require different levels of stain protection. Thus, light shaded colors show the presence of stains more than darker colors. It would be advantageous, therefore, to be able to provide different levels of stain resistance to polyamides depending upon the ultimate yarn color without having to provide a separate polyamide feedstock for optimum formulation of each color yarn.

In addition to the problems of staining of polyamide fibers, soiling of polyamide fibers is also an issue. Fibers used in textile, carpet and flooring applications are desirably low in soil pick-up, i.e., the fiber does not attract soil, and secondly the fiber is easy to clean once it is soiled. Soil proofing of polyamides typically involves one of two approaches. Firstly, a coating may be placed on the fiber which is "sacrificial" in nature, i.e., it is designed to pick up soil, but then must be removed in a cleaning process. Starch is a well known and long practiced example. Such an approach has the drawback that the fiber needs to be recoated after each cleaning to maintain its soil resistance. The second approach to soil proofing is the use of a different type of coating to change the surface energy or hydrophilic/hydrophobic balance of the polyamide, thus making it less attractive to soil. Fluorinated compounds are the most favored species in this area, applied as a topical coating to the fiber. The fluorochemical compounds are coated onto the fiber to prevent or reduce the wetting of the surface by minimizing the contact between the fiber surface and substances that can soil the fiber, making the substance easier to remove. Examples of patents in this area include U.S. Pat. Nos. 3,816,167, 3,896,035, RE30,337 and 4,043,964. The use of topical coatings of the latter type have the similar disadvantages to SACs in that they are removed from the carpet during use, routine maintenance and cleaning.

It is an object of the present invention to provide a novel and highly advantageous approach for imparting stain resistance to fibers formed from polyamides. It is yet another object of the present invention to provide stain resistant polyamide fibers with improved soil resistance in that they have low affinity for soil attraction, and if soiled, are then easy to clean.

SUMMARY OF THE INVENTION

According to the present invention acid dye stain-resistant and soil-resistant polyamide fibers are formed from a polyamide composition comprising a fiber-forming polyamide and a sulfonated polyester concentrate consisting essentially of a reagent melt compounded with a thermoplastic polyester, the polyamide fibers being advantageously formed by melt spinning, drawing and texturing. The invention includes the polyamide composition used in the method and the articles of manufacture produced from the fibers of the invention, particularly textile articles, carpets and floorcoverings.

DETAILED DESCRIPTION OF THE INVENTION

The terms below have the following meanings herein, unless otherwise noted:

"Reagent" refers to a chemical compound, composition or material which associates (as that term is defined below) with the free acid dye sites in a fiber-forming polyamide to thereby render them unavailable for association with an acid dye, which reagent is incapable itself of associating with or taking up the acid dye.

"Association" refers to the chemical reaction or bonding between the reagent and the free acid dye sites in the polyamide which results in prevention of "taking up" of the acid due by the polyamide, i.e., staining. The association may take the form of a chemical reaction or an acid-salt formulation. Additional types of association include hydrogen bonding, dipole-dipole interaction, Van der Waals forces and coordination complexing.

"Acid dye stain" refers to any material or composition which functions as an acid dyestuff by reacting or associating with the free dye sites in polyamides to substantially permanently color or stain the latter.

The term "acid dye sites" refers to those basic sites in polyamides, e.g., amine end groups, amide linkages, etc., which react or associate with acid dyes, thereby resulting in staining of the polyamide.

"Disabling" the acid dye sites from taking up acid dye stains refers to the effect of the association between the reagent and the acid dye sites which renders the latter less capable of associating with acid dyes such as, for example, those in soft drinks, tomato-based products, etc., which result in staining.

The present invention is predicated on the discovery that optimum levels of resistance to acid dye stain and improved soiling resistance may be imparted to polyamide fibers by melt compounding a sulfonated polyester concentrate with fiber-forming polyamide compositions subsequent to polymerization of the polyamide and prior to the formation of the fibers. The invention thereby enables avoidance of the above enumerated disadvantages associated with coating the polyamide with stain resistant SACs, formation of the polyamides by copolymerizing sulfonate containing monomers and with topical application of soil resistant fluorochemical formulations.

The compositions are prepared by initially melt compounding a reagent (discussed below) with a polyester thermoplastic resin using an extruder under certain conditions defined hereinafter to produce a sulfonated polyester concentrate. The sulfonated polyester concentrate is then melt compounded with a fiber-forming polyamide in a fiber spinning extruder to produce a sulfonated polyamide. Product fibers made according to the invention show durable stain-resistant properties equivalent to those produced according to the prior art methods without the consequent disadvantages attendant thereto. The product fibers have soil resistance superior to the prior art methods.

The thermoplastic polyester may be any thermally stable melt processable polyester that has a melting point temperature preferably less than 270° C. Preferred polyesters for preparation of the concentrate are poly(ethylene terephthalate) known as PET, poly(trimethylene terephthalate) known as PTT, poly(butylene terephthalate) known as PBT, poly(ethylene terephthalate-co-isophthalate) and copolyesters of poly(ethylene terephthalate) and 1,4-cyclohexanedimethanol known as PETG.

The reagent is a metal salt of sulfoisophthalic acid, preferably an alkali metal salt and most preferably the sodium and lithium salts of 5-sulfoisophthalic acid. Other metal salts of sulfoisophthalic acid can be used, including alkaline earth and transition metal salts of sulfoisophthalic acid.

The invention is applicable to any fiber-forming polyamide. The preferred polyamides are PA6 and PA66, copolymers of PA6 and PA66, or mixtures thereof.

During development of the present invention it was found that, if the reagent is melt compounded directly into either a PA6 or PA66 resin to form a sulfonated polyamide concentrate, then substantial degradation of the polyamide took place as determined through solution relative viscosity measurement. In addition, the % reagent that could be compounded into the PA6 or PA66 was limited to about 20% by weight of the total weight of the sulfonated polyamide concentrate. The product fiber formed by drawing and texturing fiber-forming polyamide when the sulfonated polyamide concentrate was added thereto on the fiber melt spinning line displayed poor stain resistance and only average soiling performance.

Other types of polyamides that have a lower propensity to hydrolytic degradation can be successfully used to form a sulfonated polyamide concentrate such as PA11 and PA12 but do not show unexpectedly improved soiling performance.

In addition, during development of the present invention, up to 10% of various thermoplastic polyesters were added to sulfonated polyamides where the sulfonate units when added at the start of the polymerization with the other desired monomers, and also to unsulfonated PA66 resins, i.e., resins that are polymerized essentially from adipic acid and hexamethylene diamine or the nylon salt of adipic acid and hexamethylene diamine. No unexpectedly improved soiling performance resulted.

The reagent may be combined with the polyester in any suitable form such as powdered, pelletized, encapsulated, etc. The polyester may be employed as a powder, granules or pellets. The reagent and the polyester are preferably combined employing a melt extruder and, most preferably, a screw-type extruder. Optimally, a twin-screw extruder of the fully intermeshing type with both screws rotating in the same direction (co-rotating) is employed, although other types of twin-screw extruders may be used such as counter-rotating and/or non-intermeshing types. Single screw extruders may also be employed. The extruder preferably has a barrel length to diameter ratio of at least 24:1; however, it will be understood that any suitable ratio may be employed depending upon the parameters of the particular compounding process contemplated.

While it is no way intended to limit the invention by the soundness or accuracy of any theory set forth to explain the nature of the invention, it is postulated that, during the processing step(s), the sulfonated polyester concentrate at least partially associates with, or reacts with, reactive chemical groups or acid dye sites on the polyamide, such as amine end groups or amide linkages. Removal of volatiles from the compounding mixture of reagent and polyester aids the subsequent association and/or reaction with the polyamide. This removal of volatiles is achieved preferably by the presence of one or more vents on the extruder barrel. The optimum position of the vent ports on the barrel is determined by the extruder screw profile and the barrel length to diameter ratio used. The extraction of volatiles through the vent port is preferably vacuum assisted with a vacuum level of greater than 10 in. Hg and preferably greater than 20 in. Hg. The rate of devolatilization can be assisted through substantially dry nitrogen or inert gas injection through an inlet port on the barrel either upstream or downstream of the vent port. Under this situation, a lower vacuum level may be acceptable. Additional ways of promoting the subsequent association and/or reaction with the polyamide are through controlled drying of the feedstocks, addition of water scavenging additives, or a combination of the methods discussed hereinabove. The reagent and the polyester are preferably dried prior to melt compounding to a moisture content of less than 1000 ppm. The sulfonated concentrate prepared may contain from 10% up to about 65% by weight of reagent by total weight of the concentrate, though it is preferably in the range of 20% to 50% weight of the reagent by total weight of the concentrate.

The sulfonated polyester concentrate is then dried prior to fiber melt spinning. The preferred moisture content of the concentrate prior to melt spinning is less than 500 ppm, and most preferably less than 100 ppm. The sulfonated polyester concentrate is easy to dry in comparison to sulfonated polyamides in that higher drying temperatures can be used to dry the polyesters than polyamides without degradation occurring that may be detrimental to the fiber-forming process and the properties of the product fibers. The concentrate is then melt compounded with a pre-dried fiber-forming polyamide. The amount and ratios of fiber-forming polyamide to concentrate may be varied according to desired needs. Generally, it is preferred to employ combinations containing about 1000 up to a maximum of about 3,000 ppm sulfur. The polyamide should have a relative solution viscosity (RV) of greater than 2.9 and preferably greater than 3.1 and less than 4.0. The RV of the polyamide is determined by first preparing a 0.55% weight by weight solution of the pre-dried polyamide in 96% sulfuric acid. Solution flow times are determined in a Cannon-Ubbelohde size 2 viscometer suspended in a temperature controlled water bath set at a temperature of 25° C.±0.02° C. The flow times of the sulfuric acid are also measured. The RV is calculated by dividing the flow time of the polyamide solution by the flow time of the sulfuric acid. The polyamide is typically produced by melt polymerization, although other methods known to those ordinarily skilled in the art such as, e.g., solution polymerization, may be used. The desired RV may be achieved wholly through melt polymerization or a two-step process may be employed, i.e., melt polymerization to an RV value lower than that desired, followed by solid state polymerization to the desired value. The polyamide should also have an amine end group (AEG) level of less than 35 equivalents per $10^6$ g and preferably less than 30 equivalents per $10^6$ g. The AEG level is determined by means of a potentiometric titration. A known weight of sample is dissolved in m-cresol and titrated against 0.1 M perchloric acid in methanol. A blank titration is also carried out on the m-cresol and used to correct the sample titer. The polyamide is preferably dried to a moisture content of less than 1000 ppm. The concentrate is mixed with the polyamide in the desired ratio depending on the level of stain resistance required in the fiber product.

Alternatively, the polyamide and the sulfonated concentrate may be combined in a prefiber spinning compounding operation or directly in the fiber melt spinning stage. The fiber melt spinning process of a conventional type is used, familiar to those skilled in the art. Functional additives may be added during the fiber formation process such as colorants, anti-oxidants, stabilizers, antimicrobials, melt viscosity enhancers, nucleating agents, antistatic agents, processing aids, flame retardants or mixtures thereof. The spun fiber may then be textured using air-jet texturing or mechanical crimp texturing. Product fibers made according to the invention show durable stain resistant properties equivalent to those produced according to prior art methods. The product fibers have soil resistance that is superior to those produced according to prior art methods.

Only a small proportion of the reagent is reacted with the fiber-forming polyamide. The bulk of the reagent is dispersed/associated with the resin. It is desired that a proportion of the reagent is reacted with the fiber-forming polyamide. Polyamide copolymers are conventionally produced by a condensation polymerization where water (or other small volatile molecule, depending on the chemistry) is generated as a by-product. In order to drive this equilibrium reaction forward, it is necessary to remove this water by-product from the system below the equilibrium water concentration. If this achieved in the fiber melt spinning line, then association/reaction of the reagent in the concentrate with the fiber-forming polyamide will occur. In fiber melt spinning lines, either vented or non-vented extruder barrels can be used. The water concentration can be reduced to below the equilibrium value by any of the methods discussed hereinabove. The fiber melt spinning, drawing and texturing processes used are conventional in type and familiar to those ordinarily skilled in the art.

Extraction analysis on the fibers of the invention have shown that the reagent is permanently fixed in the polyamide matrix as discussed in the Examples given below.

Either the fibers or yarns prepared from this invention may be manufactured into novel textiles, carpets and other articles of manufacture requiring polyamides with enhanced resistance to staining by acid dyestuffs or enhanced soiling resistance according to conventional, well known methods. The textured yarn is most ideally used to produce a carpet using methods of manufacture known to those ordinarily skilled in the art, including tufting, weaving, bonding, needle-loom and knitting. Detailed descriptions of these methods can be found at pages 134 to 140 of "Synthetic Fiber Materials," edited by H. Brody, published by Longman, 1994, the disclosure of which is incorporated by reference.

In the following examples, a standard test is used to evaluate the stain resistance of the yarn formed. It involves the use of an acidified solution of FD & C Red 40 dye which is present in the soft drink cherry flavored Kool-Aid® commercially sold by Kraft General Foods, Inc.

Red 40 Stain Test 0.1000 g±0.0030 g of FD & C Red 40 dye (CI Food Red 17) is dissolved in 1,000 cm$^3$ of distilled water. The pH of the dye solution is adjusted to between 2.80 and 2.90 by making small additions of technical grade citric acid. The pH adjusted solution is allowed to reach ambient temperature, i.e., 21° C.±1° C., prior to use. The carpet is laid on a hard, flat non-porous surface. 50 mls±1 ml of the Red 40 dye solution is poured into a 2 inch ring placed on the carpet. A plunger is inserted into the ring and is moved up and down 5 times without rotation to ensure that the application of the solution is even and the fibers are fully wetted. The ring is removed and the carpet is left to air dry for 24 hours at ambient temperature. The carpet is then washed with running mains water of a temperature of 45° C.±5° C. for 2 minutes. As much as possible of the water is removed using a vacuum extractor. The carpet is then left for a further 24 hours to air dry at ambient temperature. If red dye wicks to the surface of the carpet during this drying period then the washing steps indicated above are repeated. The stain resistance of the carpet face yarn is determined by visual comparison to the AATCC Red 40 Stain Scale, which is available from the American Association of Textile Chemists and Colorists (AATCC), Research Triangle Park, N.C. The scale consists of ten transparent film squares colored with gradually increasing strengths of FD & C Red 40 numbered from 1 to 10 with 1 being the strongest color and 10 being colorless. A sample of the unstained carpet is placed underneath the colored portions of the scale and the stained carpet is placed underneath the colorless portion of the scale and viewed under the daylight or equivalent illuminant. The light should be incident upon the surfaces at an angle of 45°±5° and the viewing direction should be 90°±5° to the plane of the surfaces. The stained carpet is compared to the unstained carpet placed under the closest numbered colored square of the stain scale so that the best color match is obtained. If the color of the stained carpet falls between two squares on the scale, then half grades are given. The number of this colored square, or squares of the match falls between two squares, is called the Stain Rating.

Carpet Wear Testing

Tufted carpet was tested per ASTM Test Method D5252-92 to 50,000 revolutions at 70° F. and 50% R.H. An Electrolux upright vacuum cleaner model LXE was used to vacuum the carpet after the test and before grading. The carpet was not vacuumed after every 2000 revolutions as detailed in the ASTM Test Method. The worn carpet samples were graded using the Carpet and Rug Institute Reference Scale A. This scale consists of four photographs numbered from 1 to 4 showing gradually increasing degrees of wear, appearance deterioration or matting. A grade of 1 indicates a badly worn sample. A grade of 5 indicates that no wear has occurred. If the tested sample falls between two photographs, then a half grade is given. For example, if the degree of wear falls between photographs 3 and 4 then a grade of 3.5 is given. This test is known by those of ordinary skill in the art to simulate human foot traffics. One revolution of the test drum is considered to be equivalent to 8–12 foot traffics.

Soiling Test

Tufted carpet was tested for soiling using the similar apparatus to that used for the carpet wear testing method given above. 1.5000±0.0020 g of SPS-2001 Standard Carpet Dry Soil available from 3M, St. Paul, Minn., was sprinkled evenly over carpet of dimensions 25.5 inches by 8.25 inches using a fine sifter. The carpet was carefully placed inside the test drum and 150 of 5.03±0.03 g of clean, soil-free flint pellets were added to the drum. The lid of the drum is secured and the drum is placed on the drum roller. The drum is rolled for 500 rotations which is called 1 soiling cycle. The carpet was then removed from the drum and vacuumed with the handheld Beaterbar of an Electrolux upright vacuum cleaner model LXE. The soiled and vacuumed carpet was graded using the AATCC Grey Scale for Staining. The scale consists of 10 pairs of grey rectangles, the pairs representing progressive differences in color or contrast. The scale runs from 1 to 5 in half unit grades, with a value of 1 indicating gross change in color or contrast, and 5 being no color or contrast change. The test may then be repeated as desired to evaluate the effect of multiple soiling cycles. The soiled carpets are then evaluated for ease of cleaning with hot mains water (55° C.±5° C.) using the Deluxe Hand Tool of a Windsor® Passport™ wet extractor (carpet cleaner) supplied by Windsor Industries, Inc., Englewood, Colo. No detergent or other cleaning agent other than water is used in the evaluation. Five passes of the Hand Tool using the water spray and wet extraction are done in opposite directions over the carpet. The carpet is then left for 24 hours to air dry at ambient temperature before grading using the AATCC Grey Scale for Staining.

Colorfastness to Oxides of Nitrogen Test

Colorfastness to oxides of nitrogen was tested using AATCC Test Method 164-1997, for 1, 3 and 5 cycles, at a temperature of 40° C.±1° C., and a relative humidity of 87.5±2.5%.

Accelerated Ultraviolet (UV) Light Weatherinq

Colorfastness to UV light was tested using AATCC Test Method 16, Option E. The face yarn side (front) of the carpet sample is exposed. The back of carpet sample is covered (backed) to prevent exposure. The acceptance of the result is not compared to a reference sample. The specimen is compared to the masked portion of the specimen. The colorfastness to light rating is determined using the AATCC Gray Scale for Color Change. The ambient (dry bulb) temperature is 43° C.±2° C., the black panel temperature is 63° C.±1° C. and the relative humidity is 30%±5%. The exposure is controlled by the AATCC Blue Wool Lightfastness Standard L4. The radiant energy is 1.10±0.03 W/m$^2$ at 420 nm. The total radiant energy is 170 kJ with an elapsed exposure time of 85 hours. The type of test apparatus is a xenon-arc, manufactured by Atlas Electric Devices Co., Model No. 65-WR, Serial No. XE-523FC, with a 2-tier specimen rack and a distilled water supply.

Bleach Test

The carpet is laid on a hard, flat non-porous surface. 20 mls±1 ml of Clorox® (a registered tradename of The Clorox Company, Oakland, Calif.) regular bleach, containing 5.25% of sodium hypochlorite and 94.75% of inert ingredients, is poured into a 2 inch ring placed on the carpet. A plunger is inserted into the ring and is moved up and down 5 times without rotation to ensure that the Clorox application is even and the fibers are fully wetted. The ring is removed and the carpet is left to air dry for 24 hours at ambient temperature. The carpet is then washed with running water of a temperature of 45° C.±5° C. for 2 minutes. As much as possible of the water is removed using a vacuum extractor. The carpet is then left for a further 24 hours to air dry at ambient temperature. The carpet is then graded using the AATCC Gray Scale for Color Change.

Reagent Extraction Test 5.0000 g±0.0010 g of yarn is placed in 100 mls of methanol in a pre-weighed round bottomed flask and fitted with a condenser. The methanol is heated to boiling reflux for 16 hours. The yarn is removed from the methanol and washed with 2×50 mls aliquots of methanol which are added to flask containing the refluxed methanol. The methanol in the flask is evaporated to dryness. The weight of any residue is then determined.

The invention is illustrated by the following non-limiting examples.

EXAMPLES

The following yarn spinning, draw-texturing and carpet tufting methods were applied to the examples.

Yarn Spinning

Undrawn yarns were spun using an unvented melt spinning extrusion system of a type and configuration known to those skilled in the art. The polymer melt was filtered through a screen pack containing a 50×250 mesh screen prior to being metered to a 60 hole die with trilobal (Y)

shaped holes. The 60 filaments produced were separated into 2×30 filament bundles, spin finish applied, and the two bundles wound up onto separate winders to produce an undrawn yarn with a denier of 1850 g/9000 m with a filament count of 30, ("1850/30Y").

Yarn Draw-Texturing 4 ends of the 1850/30Y undrawn yarn produced were cotextured using mechanical crimp draw-texturing at a draw ratio of 3.6 to give a 2400/120Y bulked continuous filament (BCF) yarn.

Carpet Tufting

The BCF yarn was tufted into a $1/10^{th}$ gauge, $3/16$ inch pile height level loop carpet construction and back with a latex backing, to give an approximate yarn face weight of 20 oz. In the course of the development work carried out in pursuance of the present invention it has been found that different types of backing may result in different properties of the face yarn of the carpet, including wear and stain resistance performance. In the Examples given below, the same latex backing has been used for all carpets produced. The latex is STIX 320™ Custom Rug Laminating Adhesive supplied by XL Corp., Calhoun, Ga.

Examples 1 to 4
(Comparative Example)

A sulfonated PA66 resin, polymerized from the nylon salt of adipic acid and hexamethylene diamine, with 5-sodiosulfoisophthalic acid, containing 2,300 ppm of sulfur, with an RV=2.7, and a moisture level of 650 ppm, was melt spun, drawn and textured. A formulated masterbatches containing various pigments were added during the melt spinning stage to give the yarn a beige coloration ("Light Wheat"). A copper/iodide based stabilizer was also added. 0.3% oil on yarn of Lurol NF-6239 spin finish supplied by Goulston Technologies, Monroe, N.C., was applied to the yarn with various levels of Scotchguard FC-248 supplied by 3M, St. Paul, Minn. The level of spin finish was determined by an FTIR method. The amount of fluorine on the yarn was determined by a combustion method. The yarns were tufted in carpet and tested for Red 40 staining, soiling, wear, colorfastness to oxides of nitrogen and accelerated UV weathering. The results are given in Table 1.

Example 5
(Comparative Example Showing that Use of Polyamide in the Sulfonated Concentrate Does Not Provide Surprising or Unexpected Results over Prior Art)

A PA66 resin, polymerized from the nylon salt of adipic acid and hexamethylene diamine, with an RV=3.2 an AEG level of 27 equivalents per $10^6$ g and a moisture level of less than 500 ppm was melt compounded with 10% wt. of the lithium salt of 5-sulfoisophthalic acid (LiSIPA) also dried to a moisture level of 170 ppm. The melt compounding was carried out in a 40 mm co-rotating twin-screw extruder with a length-to-diameter ratio of 24:1 which was vented with vacuum assistance of 22 in. Hg. The sulfonated polyamide concentrate produce strand produced from the extrusion process was extremely brittle and difficult to pelletize. The RV of the sulfonated polyamide concentrate was 2.0. 20% of this sulfonated polyamide concentrate was added to the same polyamide resin feedstock used to make the concentrate and melt spun, drawn and textured. 0.3% oil on yarn of Lurol NF6239 spin finish containing 0.13% of Scotchguard FC-248 was applied to the yarn. The yarn produced was tufted into carpet and tested for Red 40 staining. The stain rating of the face yarn on the carpet was 4.0.

Example 6
(Comparative Example Showing the Poor Stain Resistance of Unsulfonated Polyamide)

The same PA66 used in Examples 1 to 4 was melt spun, drawn and textured without the addition of sulfonates. 0.3% oil on yarn of Lurol NF-6239 spin finish containing 0.13% ppm of Scotchguard FC-248 was applied to the yarn. The yarn produced was tufted into carpet and tested for Red 40 staining. The stain rating of the face yarn on the carpet was 4.0.

Example 7
(Comparative Example Showing that the Addition of PBT to Sulfonated Polyamide Does Not Provide Surprising or Unexpected Results)

10% of PET with an IV=0.67 and pre-dried to a moisture level of less than 50 ppm was added to the sulfonated PA66 resin of Examples 1 to 4 and melt spun, drawn and textured. 0.3% oil on yarn of Lurol NF-6239 spin finish containing 0.13% of Scotchguard FC-248 was applied to the yarn. A formulated off-white pigment concentrate ("Ceiling White") containing copper/iodide stabilizer was also added during the spinning process. The yarns were tufted into carpet and tested for Red 40 staining, soiling, wear, colorfastness to oxides of nitrogen and accelerated UV weathering. The results are given in Table 2.

Example 8
(Comparative Example Showing that the Addition of PBT to Sulfonated Polyamide Does Not Provide Surprising or Unexpected Results)

10% of PBT and pre-dried to a moisture level of 80 ppm was added to the pre-dried sulfonated PA66 resin of Examples 1 to 4 and melt spun, drawn and textured. 0.3% oil on yarn of Lurol NF-6239 spin finish containing 0.13% of Scotchguard FC-248 was applied to the yarn. The same Ceiling White pigment concentrate containing copper/iodide stabilizer of Example 7 was also added during the spinning process. The yarns were tufted in carpet and tested for Red 40 staining, soiling, wear, colorfastness to oxides of nitrogen and accelerated UV weathering. The results are given in Table 2.

Example 9
(Comparative Example Showing that the Addition of PET to Unsulfonated Polyamide Does Not Provide Surprising or Unexpected Results)

10% of PET of Example 7 was added to the pre-dried (unsulfonated) PA66 resin of Example 5 and melt spun, drawn and textured. 0.3% oil on yarn of Lurol NF-6239 spin finish containing 0.13% of Scotchguard FC-248 was applied to the yarn. The same Ceiling White pigment concentrate containing copper/iodide stabilizer of Example 7 was also added during the spinning process. The yarn produced was tufted into carpet and tested for Red 40 staining. The stain rating of the face yarn on the carpet was 4.5.

Example 10
(Comparative Example Showing that the Addition of PBT to Unsulfonated Polyamide Does Not Provide Surprising or Unexpected Results)

10% of PBT of Example 8 was added to the pre-dried (unsulfonated) PA66 resin of Example 5 and melt spun, drawn and textured. 0.3% oil on yarn of Lurol NF-6239 spin finish containing 0.13% of Scotchguard FC-248 was applied to the yarn. The same Ceiling White pigment concentrate containing copper/iodide stabilizer of Example 7 was also added during the spinning process. The yarn produced was tufted into carpet and tested for Red 40 staining. The stain rating of the face yarn on the carpet was 4.5.

Examples 11 to 14

Four different sulfonated polyester concentrates were prepared from PET, PBT, PTT and PETG. The PETG had a softening point of 78° C. Each of the four concentrates were prepared and evaluated in a fiber-forming polyamide resin in the following manner. The polyester and 5-sodiosulfoisophthalic acid (50:50 weight basis) of a moisture level of less than 1000 ppm were melt compounded in a 30 mm twin-screw extruder with a length to diameter ratio of about 30:1 which was vented with vacuum assistance of between 15 to 20 in. Hg. Continuous strand was produced from the extruder that was easy to pelletize. The sulfonated polyester concentrate produced was dried to a moisture level of less than 100 ppm, except for the concentrate containing PETG which was dried to a moisture level of 450 ppm. The concentrate was added at a level of 4% by weight to the (unsulfonated) PA66 resin of Example 5 during the melt spinning process. The same Ceiling White pigment concentrate containing copper/iodide stabilizer of Example 7 was also added during the spinning process. The undrawn yarn produced was draw-textured. 0.3% oil on yarn of Lurol NF-6239 spin finish containing 0.13% of Scotchguard FC-248 was applied to the yarn. The yarns were tufted in carpet and tested for Red 40 staining, soiling, wear, colorfastness to oxides of nitrogen and accelerated UV weathering. Example 11 yarn was prepared using a sulfonated polyester concentrate from PETG. Example 12 yarn was prepared using a sulfonated polyester concentrate from PBT. Example 13 yarn was prepared using a sulfonated polyester concentrate from PTT. Example 14 yarn was prepared using a sulfonated polyester concentrate from PET. The results are given in Table 2. The yarns produced from Examples 11 to 14 were subjected to the Reagent Extraction Test described above. No residue was recorded for these four Examples.

Example 15
(Further Comparative Example)

The sulfonated PA66 resin of Example 1 was melt spun with the same Ceiling White pigment concentrate containing copper/iodide stabilizer as Examples 10 to 13 and the undrawn yarn then draw-textured. 0.3% oil on yarn of Lurol NF-6239 spin finish containing 0.13% of Scotchguard FC-248 was applied to the yarn. The same Ceiling White pigment concentrate containing copper/iodide stabilizer of Example 7 was also added during the spinning process. The yarns were tufted in carpet and tested for Red 40 staining, soiling, wear, colorfastness to oxides of nitrogen and accelerated UW weathering. The results are given in Table 2. The yarn was subjected to the Reagent Extraction Test described above. No residue was recorded for this Example.

Example 16
(Further Comparative Example)

The unsulfonated PA66 resin of Example 4 was melt spun with the same Ceiling White pigment concentrate containing copper/iodide stabilizer of Example 7 and the undrawn yarn then draw-textured. 0.3% oil on yarn of Lurol NF-6239 spin finish containing 0.13% of Scotchguard FC-248 was applied to the yarn. The yarns were tufted in carpet and tested for Red 40 staining, soiling, wear, colorfastness to oxides of nitrogen and accelerated UV weathering. The results are given in Table 2. The yarn was subjected to the Reagent Extraction Test described above. No residue was recorded for this Example.

I claim:

1. An acid dye stain-resistant and soil-resistant fiber-forming polyamide composition comprising:
   (a) a fiber-forming polyamide, and
   (b) a concentrate including a melt-compounded blend of a thermoplastic polyester having a melting point of less than 270° C. and a reagent including a metal salt of sulfoisophthalic acid, at least a portion of which associates with free acid dye sites in said polyamide, thereby disabling said acid dye sites in fibers formed from said composition from taking up acid dye stains.

2. The composition of claim 1 wherein said concentrate contains about 10 to 65% by weight of said reagent.

3. The composition of claim 1 wherein said thermoplastic polyester is selected from the group consisting of PET, PTT, PBT, PETG, poly(ethylene terephthalate-co-isophthalate), and mixtures thereof.

4. The composition of claim 1 wherein said reagent is a metal salt of 5-sulfoisophthalic acid.

5. The composition of claim 4, wherein said reagent is an alkali metal salt of 5-sulfoisophthalic acid.

6. The composition of claim 5, wherein said reagent is the lithium salt of 5-sulfoisophthalic acid.

7. The composition of claim 5, wherein said reagent is the sodium salt of 5-sulfoisophthalic acid.

* * * * *